May 8, 1956    F. MEYER    2,744,378
PALLET BRIDGE FOR WATCH OR CLOCK MOVEMENTS
Filed July 21, 1953
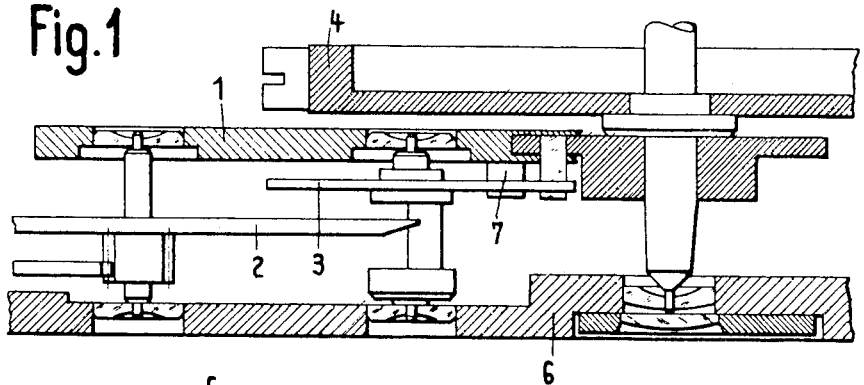
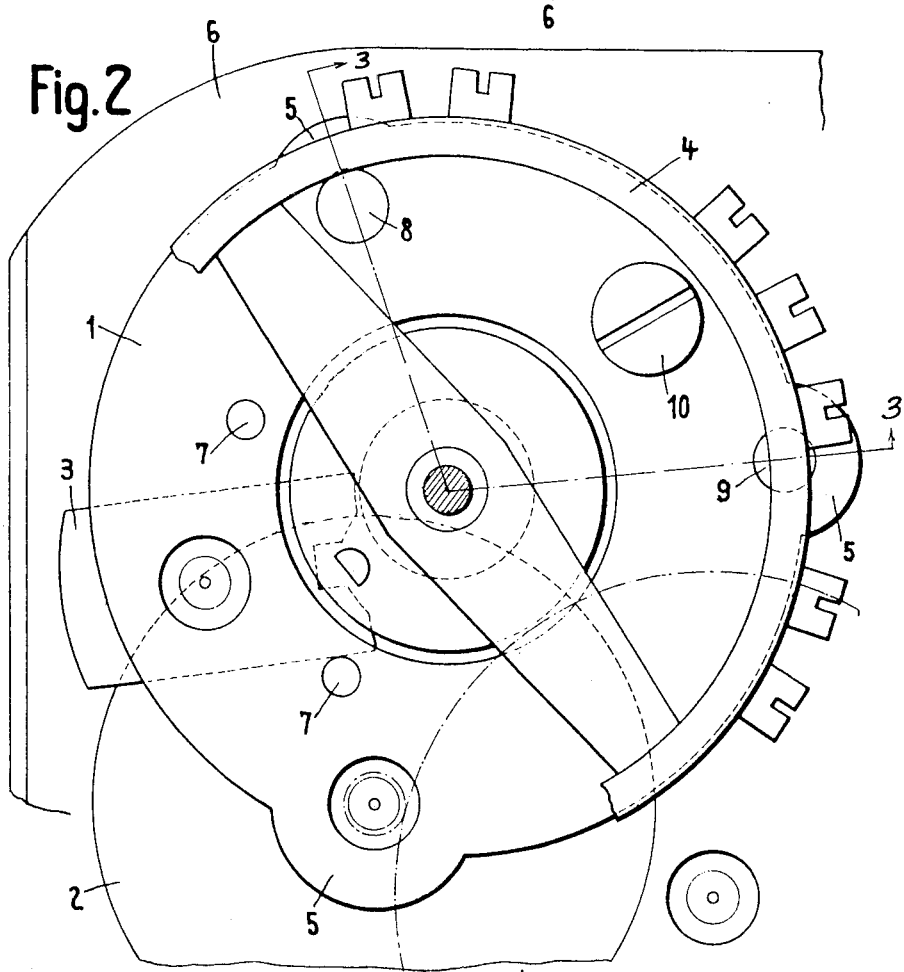
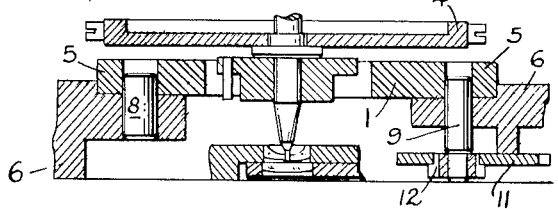
INVENTOR
FRIEDRICH MEYER
BY
ATTORNEY

United States Patent Office 2,744,378
Patented May 8, 1956

2,744,378
PALLET BRIDGE FOR WATCH OR CLOCK MOVEMENTS

Friedrich Meyer, Grenchen, Switzerland, assignor to Felsa A. G., Grenchen, Switzerland Application July 21, 1953, Serial No. 369,412

Claims priority, application Switzerland August 7, 1952

9 Claims. (Cl. 58—104)

The present invention relates to a pallet bridge for watch or clock movements, which has the shape of a ring and serves as a bearing for the escape wheel and for a lever or pallet cooperating with the balance.

The pallet bridge according to the invention is arranged coaxially with the balance and carries two pins for the purpose of limiting the movement of the lever, at least one of these pins being placed within the limits of the escape wheel.

The accompanying drawing shows, by way of example, an embodiment of the invention. Therein is:

Fig. 1 a partial section, and

Fig. 2 a plan view of the parts necessary for understanding the invention.

Fig. 3 a sectional view taken along the line 3—3 of Fig. 2.

In the drawing the pallet bridge 1 is a disc having the shape of a ring which serves as a bearing for the escape wheel 2 and for a lever 3 cooperating with the balance 4. The disc 1 is arranged coaxially with the balance 4 and has three lugs 5 distributed on its periphery.

Two pins 7 are fixed on the disc 1 for the purpose of limiting the movement of the lever 3, instead of being fixed as usually to the pillar plate. One of these pins 7 is placed, as shown in Fig. 2, within the limits of the escape wheel 2. The second pin 7 might also be placed within these limits.

The drive of the lever 3 by the escape wheel 2 is of the type of the cylinder escapements with the difference that the escape wheel 2, instead of directly acting on the balance 4, actuates the lever 3 and imparts to it an oscillation of small amplitude. The lever 3 in its turn transmits its movement to the balance 4 which can in this way execute oscillations of great amplitude.

An imaginary straight line interconnecting the axes of the escape wheel 2 and of the lever 3 forms an acute angle with an imaginary straight line interconnecting the axes of the lever 3 and of the balance 4.

Two feet 8 and 9 carried by the pillar plate 6 engage in openings provided in the lugs 5 and serve to orient the bridge 1 in position on the pillar plate 6. The lugs 5 leave enough place for the feet 8 and 9, so that the distance between said feet can be chosen rather great. The feet 8 and 9 are placed approximately opposite, with respect to the balance axis, to the axes of the escape wheel 2 and the lever 3, respectively. The pallet bridge 1 is secured to the pillar plate 6 by means of a screw 10. The foot 9 also acts as a support for a minute wheel 11 and a pinion 12.

The arrangement as shown and described is advantageous in that it enables the use of a composite lever-cylinder escapement in small non-round watches. The pallet bridge provides a structure in which any desired magnitude may be had of the angle formed by the intersection of the two lines, one of which is through the axes of the escape wheel 2 and the lever 3, the other line being through the axes of the lever 3 and the balance 4. By reason of the shape of the pallet bridge 1, the parts of the escapement may be arranged in other than in a straight line to provide a better use of the available space such as in non-round watches. Also, by the use of the pallet bridge 1, a movement for a cylinder escapement may be adapted for use of a composite lever-cylinder escapement without extensive modification of the tools. Further, a pillar plate designed for the escapement shown can without more ado be used with a usual cylinder escapement.

While I have described and illustrated one embodiment of my invention, I do not wish to unnecessarily limit the scope of my invention, but reserve the right to make such modifications and rearrangements of the several parts as may come within the purview of the accompanying claims.

What I claim is:

1. A pallet bridge for use in a timepiece movement including a pillar plate, a composite lever-cylinder escapement including an escape wheel and a lever driven by the escape wheel, and a balance adapted to be driven by the lever, the pallet bridge having a ring shape and coaxial with the balance axis, the escape wheel and the lever pivoted in the pillar plate and in the pallet bridge, at least two lugs extending from the periphery of the pallet bridge each having an opening therein, at least two feet carried by the pillar plate, the feet engaging in the openings and serving to orient the pallet bridge in position on the pillar plate, two pins fixed to the pallet bridge and adapted to limit the movement of the lever, at least one of these pins being placed within the limits of the escape wheel, and a screw securing the pallet bridge to the pillar plate, the feet positioned so that a line drawn therebetween and a line drawn between the pivots of the escape wheel and the lever are on either side of the balance wheel pivot.

2. A pallet bridge for use in a timepiece movement including a pillar plate, a composite lever-cylinder escapement including an escape wheel and a lever driven by the escape wheel, and a balance adapted to cooperate with the lever, the pallet bridge having a ring shape, the escape wheel and the lever pivoted in the pillar plate and in the pallet bridge, at least two lugs extending from the periphery of the pallet bridge each having an opening therein, at least two feet carried by the pillar plate, the feet engaging in the openings and serving to orient the pallet bridge on the pillar plate, two pins fixed to the pallet bridge and adapted to limit the movement of the lever, at least one of these pins being placed within the limits of the escape wheel, and a screw securing the pallet bridge to the pillar plate, the feet being positioned so that a line drawn therebetween and a line drawn between the pivots of the escape wheel and the lever are on either side of the balance wheel pivot.

3. A pallet bridge for use in a timepiece movement including a pillar plate, a composite lever-cylinder escapement including an escape wheel and a lever driven by the escape wheel, and a balance adapted to cooperate with the lever, the pallet bridge having a ring shape, the escape wheel and the lever pivoted in the pillar plate and in the pallet bridge, at least two lugs extending from the periphery of the pallet bridge each having an opening therein, at least two feet carried by the pillar plate, the feet engaging in the openings and serving to orient the pallet bridge on the pillar plate, two pins fixed to the pallet bridge and adapted to limit the movement of the lever, and a screw securing the pallet bridge to the pillar plate, said feet being positioned so that a line drawn therebetween and a line drawn between the pivots of the escape wheel and the lever are on either side of the balance wheel pivot.

4. A pallet bridge for use in a timepiece movement including a pillar plate, a composite lever-cylinder escapement including an escape wheel and a lever driven by the escape wheel, and a balance adapted to coopearte with the lever, the pallet bridge having a ring shape, the escape wheel and the lever pivoted in the pillar plate and in the pallet bridge, at least two lugs provided at the periphery of the pallet bridge each having an opening therein, at least two feet carried by the pillar plate, the feet serving to orient the pallet bridge on the pillar plate, and two pins fixed to the pallet bridge and adapted to limit the movement of the lever, at least one of the pins being placed within the limits of the escape wheel.

5. A pallet bridge for use in a timepiece movement including a pillar plate, a composite lever-cylinder escapement including an escape wheel and a lever driven by the escape wheel, and a balance adapted to cooperate with the lever, the pallet bridge having a ring shape, the escape wheel and the lever pivoted in the pillar plate and in the pallet bridge, at least two lugs provided at the periphery of the pallet bridge each having an opening therein, at least two feet carried by the pillar plate, the feet serving to orient the pallet bridge on the pillar plate, and two pins fixed in the pallet bridge and adapted to limit the movement of the lever.

6. A pallet bridge for use in a timepiece movement including a pillar plate, an escapement including an escape wheel and a lever driven by the escape wheel, and a balance adapted to cooperate with the lever, the pallet bridge having a ring shape, the escape wheel and the lever pivoted in the pillar plate and in the pallet bridge, at least two lugs provided at the periphery of the pallet bridge each having an opening therein, at least two feet carried by the pillar plate, the feet engaging in the openings and serving to orient the pallet bridge on the pillar plate, and two pins fixed in the pallet bridge and adapted to limit the movement of the lever.

7. A pallet bridge for use in a timepiece movement including a pillar plate, an escapement including an escape wheel and a lever driven by the escape wheel, and a balance adapted to cooperate with the lever, the pallet bridge having a ring shape, the escape wheel and the lever pivoted in the pillar plate and in the pallet bridge, and at least two lugs provided at the periphery of the pallet bridge each having an opening therein, at least two feet carried by the pillar plate, the feet engaging in the openings and serving to orient the pallet bridge on the pillar plate.

8. A pallet bridge for use in a timepiece movement including a pillar plate, an escapement including an escape wheel and a lever driven by the escape wheel, and a balance adapted to cooperate with the lever, the pallet bridge having a ring shape, the escape wheel and the lever pivoted in the pillar plate and in the pallet bridge, and at least two feet carried by the pillar plate and serving to orient the pallet bridge on the pillar plate.

9. A pallet bridge for use in a timepiece movement including a pillar plate, an escapement including an escape wheel and a lever driven by the escape wheel, and a balance adapted to cooperate with the lever, the pallet bridge having a ring shape, the escape wheel and the lever pivoted in the pillar plate and in the pallet bridge, means carried by the pillar plate and serving to orient the pallet bridge on the pillar plate, and means for fixing the pallet bridge to the pillar plate.

References Cited in the file of this patent
UNITED STATES PATENTS

| 144,270 | Frankfeld | Nov. 4, 1873 |
| 200,539 | Hutchinson | Feb. 19, 1878 |
| 432,290 | Abbott | July 15, 1890 |

FOREIGN PATENTS

| 16,595 | Switzerland | Apr. 16, 1898 |
| 72,756 | Switzerland | June 16, 1916 |
| 237,431 | Switzerland | Sept. 1, 1945 |